(12) United States Patent
DuBois

(10) Patent No.: US 8,677,752 B2
(45) Date of Patent: Mar. 25, 2014

(54) POWER GENERATION SYSTEM

(75) Inventor: John R. DuBois, Palm Beach Gardens, FL (US)

(73) Assignee: MINE-NRG, Inc., Jupiter, FL (US)

( * ) Notice: Subject to any disclaimer, the term of this patent is extended or adjusted under 35 U.S.C. 154(b) by 412 days.

(21) Appl. No.: 13/164,350

(22) Filed: Jun. 20, 2011

(65) Prior Publication Data

US 2011/0247328 A1    Oct. 13, 2011

Related U.S. Application Data

(63) Continuation-in-part of application No. 11/936,821, filed on Nov. 8, 2007, now Pat. No. 7,984,613.

(51) Int. Cl.
*F03G 7/00* (2006.01)
*F01B 21/04* (2006.01)

(52) U.S. Cl.
USPC ............................... 60/641.2; 60/670; 60/698

(58) Field of Classification Search
USPC .................... 60/641.2, 641.3, 641.4, 670, 698
See application file for complete search history.

(56) References Cited

U.S. PATENT DOCUMENTS

| | | |
|---|---|---|
| 3,894,393 A | 7/1975 | Carlson |
| 3,988,896 A | 11/1976 | Matthews |
| 3,991,817 A | 11/1976 | Clay |
| 4,018,543 A | 4/1977 | Carson et al. |
| 4,070,131 A | 1/1978 | Yen |
| 4,106,295 A | 8/1978 | Wood |
| 4,109,305 A | 8/1978 | Claussen et al. |
| 4,157,014 A | 6/1979 | Clark, Jr. |
| 4,255,933 A * | 3/1981 | Bailey et al. ................. 60/641.2 |
| 4,297,847 A | 11/1981 | Clayton |
| 4,453,383 A | 6/1984 | Collins |
| 4,497,177 A | 2/1985 | Anderson |
| 4,507,916 A | 4/1985 | Anderson |
| 4,779,006 A | 10/1988 | Wortham |
| 4,801,811 A | 1/1989 | Assaf et al. |
| 5,047,654 A | 9/1991 | Newman |
| 5,095,705 A | 3/1992 | Daly |
| 5,096,467 A | 3/1992 | Matsui |
| 5,284,628 A | 2/1994 | Prueitt |
| 5,300,817 A | 4/1994 | Baird |
| 5,682,709 A | 11/1997 | Erickson |
| 7,026,723 B2 | 4/2006 | Moreno |
| 7,062,911 B2 | 6/2006 | Yang |

(Continued)

OTHER PUBLICATIONS

OriginOil, "Overview, Next Generation Technology", originoil.com/technology/overview (2011).

(Continued)

*Primary Examiner* — Hoang Nguyen
(74) *Attorney, Agent, or Firm* — McHale & Slavin, P.A.

(57) ABSTRACT

A geothermal power system for production of power, and in particular electrical energy, utilizing naturally occurring geothermal energy sources and a method for identifying and converting manmade and natural geological formations into a substantial source of energy and at the same time providing remediation of environmental and safety hazards. Utilizing surface air that is substantially cooler than the geothermal temperature of the subterranean cavern an induced air flow will be produced. This naturally induced air flow will be harnessed and provide the energy to the system power plants for production of electrical energy. The system includes a hydro electric power system, a geothermal well, heat recovery systems, a source of renewable biomass material, and air and water remediation systems.

28 Claims, 6 Drawing Sheets

(56) References Cited

U.S. PATENT DOCUMENTS

| | | |
|---|---|---|
| 7,086,823 B2 | 8/2006 | Michaud |
| 7,132,090 B2 | 11/2006 | Dziedzic et al. |
| 7,621,129 B2 * | 11/2009 | DuBois ................ 60/641.2 |
| D629,356 S | 12/2010 | Presz, Jr. et al. |
| 7,984,613 B2 * | 7/2011 | DuBois ................ 60/641.2 |
| 8,381,523 B2 * | 2/2013 | Eli et al. ............... 60/641.2 |
| 2003/0201646 A1 | 10/2003 | Kaploun |
| 2009/0120091 A1 | 5/2009 | DuBois |
| 2009/0217664 A1 | 9/2009 | Rapp et al. |
| 2009/0320474 A1 | 12/2009 | Giles |
| 2010/0329870 A1 | 12/2010 | Farb |
| 2011/0027067 A1 | 2/2011 | Kennedy, III et al. |
| 2011/0058937 A1 | 3/2011 | Presz, Jr. et al. |

OTHER PUBLICATIONS

"Flodesign shrouded turbine link with video", http://www.alternative-energy-news.info/wind-turbine-concept-jet-engines/, 2011.

* cited by examiner

POWER GENERATION SYSTEM

CROSS-REFERENCE TO RELATED APPLICATIONS

This application is a continuation-in-part of U.S. patent application Ser. No. 11/936,821, filed Nov. 8, 2007 U.S. Pat. No. 7,984,613, entitled "Geothermal Power Generation System and Method for Adapting to Mine Shafts", which is hereby expressly incorporated by reference. This application is also related to U.S. patent application Ser. No. 12/042,116, filed Mar. 4, 2008, entitled "Power Generation System", now U.S. Pat. No. 7,621,129, issued Nov. 24, 2009.

FIELD OF THE INVENTION

The present invention relates to a system for production of power. The invention will produce large quantities of mechanical energy from naturally occurring geothermal sources which can be converted into electrical energy.

BACKGROUND OF THE INVENTION

Geopolitical events can have dramatic repercussions on the availability of petroleum exported from the world's petroleum producing nations. It is therefore apparent that industrial as well as developing nations cannot rely on these petroleum producing countries for a consistent and reliable source of petroleum. Likewise, it is becoming increasing more difficult to locate new sources of petroleum and more and more apparent that there is only a finite quantity of easily accessible petroleum. Coal, a fossil fuel, is the largest source of energy for the generation of electricity worldwide, as well as one of the largest worldwide anthropogenic sources of carbon dioxide releases. Gross carbon dioxide emissions from coal usage are slightly more than those from petroleum and about double the amount from natural gas. According to Stanford University Physics Professor Robert Laughlin, Noble Laureate, speaking at the $60^{th}$ (2010) Lindau Noble Laureate Meeting, Lindau, Germany, "Many projections indicate that the world will be out of oil in 60 years (useable coal will last a century and a half longer, give or take.)". Greenhouse gases as well as global warming are also of critical importance when considering the impact of new power production and electrical power generation facilities. For these and other reasons as well, petroleum, coal and natural gas based combustion type power generation are very undesirable. Likewise, particularly in light of the Japan earthquake, tsunami and nuclear disaster in 2011, nuclear energy is thought of by the general public as being highly dangerous and undesirable. The vast majority of people are opposed to the new construction of nuclear facilities anywhere close to their neighborhood. In addition, the disposal of spent nuclear fuel also presents numerous problems and challenges in terms of nuclear accidents and potential acts of terrorism. Public opinion concerning nuclear power generation is therefore very negative and makes its utilization politically unacceptable. According to a news article released by CNN World News on May 30, 2011 and other members of the international press, "Germany's ruling coalition has agreed to shut down all of the nation's nuclear power plants by 2022." The planned shutdown is in the wake of the nuclear crisis in Japan. The geothermal energy contained within the earth represents an almost unlimited amount of potential energy. The ability to extract this energy in an efficient, cost effective and environmentally safe way has to date proven to be a daunting challenge. Likewise, over the course of the last several hundred years mankind has created numerous subterranean passageways through the earth for the purpose of extracting minerals and metal ores. These mining shafts provide excellent avenues through which geothermal energy can be extracted. In addition to the current active mines there are also numerous abandoned mines located around the world. These abandoned mines are generally unmarked and unsealed from public access. An abandoned mine may well contain an open yet visually obscured hole that could descend hundreds if not thousands of feet in depth. They serve no useful purpose and in fact pose a threat to the safety and wellbeing for those who unwittingly approach the area of an abandoned mine. The conversion of an abandoned mine into a geothermal source of energy provides an efficient and cost effective way of tapping geothermal energy from the earth while at the same time providing an environmentally friendly solution to an existing public environmental hazard.

There are literally hundreds of thousands of abandoned underground mines throughout the world. Their labyrinths of vertical and horizontal shafts descend deeply into the earth, some of them thousands of feet below the surface. Once the desired ore deposits were found—gold, silver, copper, coal other minerals, or even diamonds—great caverns were excavated and the raw materials were extracted from the earth. The ore was hauled to the surface and processed, usually contaminating the water and scarring the surrounding lands. Once the mines had outlived their usefulness, they were just simple abandoned. Many of these mines have been in existence for over 100 years.

According to a study published in 1996 by the US General Accounting Office (Federal Land Management: Information on Efforts to Inventory Abandoned Hard Rock Mines, GAO/RCED-96-30, February 1996), "no definitive inventory is available concerning the number of abandoned hard rock mines located on federal lands." However one agency estimate cited in the GAO report indicates that there may be over 560,000 abandoned hard rock mines in the US alone (on both public and private land sites). One objective of the 1996 GAO report was to establish the hazards and estimated costs for remediation. To quote from their report, "The problems posed by abandoned hard rock mines can generally be classified as physical safety hazards or environmental degradation. Physical safety hazards, which can lead to human injury or death, may include concealed shafts or pits, unsafe structures, and explosives. Conditions causing environmental degradation may include drainage of toxic or acidic water, which could result in soil and groundwater contamination or biological impacts."

As for the estimated costs for remediation, the 1996 GAO report says, "No nationwide cost estimate for reclaiming abandoned hard rock mines on federal lands is available. Preparing accurate estimates of the reclamation costs requires detailed assessments, or characterizations, of the sites, involving physical inspection and in-depth evaluation of the problems at each site." According to the Report, the Bureau of Mines estimates between $4 billion to $35.3 billion to reclaim less than 30,000 sites on Interior and Forest Service lands. The Mineral Policy Center estimates between $33 billion to $72 billion to reclaim the 560,000 sites it projects are in existence nationally, regardless of whether the lands are publicly or privately owned.

DESCRIPTION OF THE PRIOR ART

Geothermal powered electrical generating systems are well known. U.S. Pat. No. 4,453,383, to Collins, discloses an apparatus of generating electrical power using solar energy and an air mass rising from a mine shaft. The mine shaft has a shaft opening at approximately the ground level, and a lower end portion of the shaft includes an air inlet. A solar collector converts the sun's radiant energy into heat and heats a heat exchanger or working fluid as it passes through the solar collector to increase its temperature. A draft is induced into the mine shaft by rejecting heat from the heated working fluid, and the induced draft is used to produce electrical power. A control system operates a shaft dampener and the rate at which heat is stored in a primary reservoir so as to control the velocity of the air rising in the shaft and the power output of the electrical generator placed within the shaft.

Another type of power plant that draws its power from naturally occurring thermal energy is U.S. Pat. No. 3,894,393, to Carlson. This patent discloses a method and means for the generation of power from a controlled air flow, wherein an enclosed air mass is cooled at a high altitude below the temperature of the surrounding air. The air is isolated from the surrounding air by means of a large duct. The resulting cooler, denser air flows down the duct towards lower altitude and the energy of the falling air mass is extracted by means of a turbine generator.

Another type of power plant that draws its power from naturally occurring thermal energy is U.S. Pat. No. 4,497,177, to Anderson. This patent discloses a duct system for use in directing an air current for operation of power generators. Air movement is obtained by use of a basin of water covered by a solar energy transmitting dome spaced a distance over the basin. A surface type heat exchanger is located in the water adjacent to the bottom of the basin, and an air inlet passage is provided having one end which terminates above the water surface, beneath the dome an opposite end connected to the heat exchanger. A long air outlet passage in the form of a flexible duct is connected to the outlet from the heat exchanger, which outlet passage extends downwardly along the mountain slope. Venturi tubes are located along the air outlet passage, and vane driven devices are positioned at the venturi tubes for operation by the cooled air flowing downwardly. An air valve at the bottom end of the air outlet passage controls the rate of flow there through.

U.S. Pat. No. 5,047,654 illustrates the use of a mine shaft which uses solar collectors to activate steam boilers within the mine shaft, which in turn drive generators for producing electrical power. The system relies on solar power conversion devices and locates key elements underground thereby decreasing thermal losses. A vertical mine shaft is used for transmitting collected solar flux from the above ground heliostat fields, down to an insulated boiler. The boiler converts injected water into superheated steam which drives a steam turbine connected to an alternator or generator producing electrical power.

U.S. Pat. No. 4,779,006, discloses a system for producing electrical energy including a stack shaped and positioned generally as the letter "J" and having an intake portion, an exhaust portion and a conveying portion there between together with a vacuum producing mechanism associated with the exhaust portion fir causing air to move through the stack whereby a generator responsive to the moving air generates electricity.

Another patent of interest is U.S. Pat. No. 5,284,628 discloses the use of a convection tower for generating electricity. The evaporation of water sprayed in the tower is used to create strong airflows and to remove pollution from the air. Turbines in tunnels at the skirt section of the tower generate electricity.

Still another geothermal power plant is disclosed in U.S. Pat. No. 5,095,705, to Daly. Daly discloses a process for producing energy from introducing water down a borehole having a depth of at least 20,000 feet; providing a casing in the borehole of a certain diameter; introducing an internal pipe within the casing of a diameter less than the casing to define an annulus there between; providing a means to introduce quantities of water down the inner pipe at predetermined levels; providing an air turbine at the upper portion of the inner pipe so that when the water is introduced down the inner pipe a vacuum is established above the water flowing down the pipe, and air is sucked into the inner pipe through the blades of the air turbine to run the turbine; and allowing the water to turn to steam at the lower end of the inner pipe and returning the steam up the annulus between the inner pipe and the casing to the upper end of the casing and exiting the system.

U.S. Pat. No. 4,106,296, to Wood, discloses an air pressure differential energy generation system comprising a stack for conduction of air from a high to low atmospheric pressure level. A vapor injection device within the stack provides a method of filling the stack at least in part with water vapor. A heat exchanger is provided at the high atmospheric pressure end of the stack. A turbine is coupled to the heat exchanger and is impelled by the warmed air. An electrical generator is coupled to the turbine to produce electrical power.

U.S. Pat. No. 7,026,723, to Moreno, discloses a mountain supported solar chimney. The chimney receives air from a solar heat collector that heats the air below thereby creating an updraft of air. The air rises because of the difference in temperature and pressure between the base and the top of the chimney. The higher the difference in temperature and pressure the faster the air will rise. An array of turbines is driven by the air. At the top of the chimney a fine mist of electrically charged water, which is taken from the reservoir, is sprayed across the top of the tower thereby attracting pollution contained within the air. The water will fall because of gravity and will be collected in a second reservoir that will be sent down the mountain, through a pipe, to generate additional electrical power with a turbine.

Additionally, U.S. Pat. No. 4,801,811, to Assaf et al, discloses a method and apparatus for generating electricity by using an air dam located in the outlet of a canyon with an electrical generator positioned at the base of the air dam. The air in the canyon is cooled by spraying water into the air as it enters the canyon, and the cooled air flows downwardly towards the base of the dam and through the electrical generator. Preferably, the air dam is a flexible curtain covering the outlet of the canyon and suspension means are provided for suspending the flexible curtain at its top. The suspension means includes supports built into the canyon above the top of the curtain, the support preferably being a suspension cable suspended between towers on opposite sides of the canyon.

U.S. Pat. No. 3,894,393, to Carlson, is entitled "Power Generation Through Controlled Convection". The patent discloses a method and means for generation of power from a controlled airflow, wherein an enclosed air mass is cooled at a high altitude below the temperature of the surrounding air. Movement of the air within the duct is accomplished by an arrangement whereby the density of air within the duct is substantially different from the density outside the air duct. The resulting cooler, denser air flows down the duct toward lower altitude, and the energy of the falling air mass is extracted by means of a turbine generator.

SUMMARY OF THE INVENTION

The present invention provides a system for production of power, and in particular electrical energy, utilizing naturally occurring geothermal energy sources for conversion into electrical power.

The process begins with the identification of a candidate mine site. The unique technical aspects of this business methodology include mapping the mine and determining specific screening criteria for modeling and estimating the mine's power output potential. The criteria include, but are not limited to, 1) the location of the mine as it relates to known geothermal reservoirs and their proximity to the depth of the mine workings; 2) the diameter of each vertical or nearly vertical mine shaft; 3) the diameter of each horizontal or nearly horizontal tunnel entrance (adit); 4) the depth or length of each item defined in 2 and 3, above; 5) the smoothness of the walls of each item defined in 2 and 3, above; 6) the maximum temperature of the internal geothermal reservoir; 7) the temperature of the atmospheric air at each entry point; 8) the elevation and corresponding atmospheric pressure of the air at each entry point, the internal geothermal reservoir depth and each exit point; and 9) a map of all leakage passages, plus any air doors and other mechanical means presently employed to seal them.

Once the screening criterion is gathered and the mine map is complete, the data will be entered into a computer and analyzed with the appropriate software. This software will be used to model the candidate mine's system as a thermodynamic cycle. In doing so, the software will determine the optimal path(s) of the airflow, improve the flow to maximum efficiency by simulating sealing all leakage passages, determining the mass flow-rate, simulating the placement of turbine(s) at optimum locations, thus resulting in an estimate of the maximum extractable power potential available from the mine if it is utilized as a Geothermal Energy Conversion System (GECS).

Surface level (cold) air is captured in an air induction chamber and enters a substantially vertical and or horizontal intake shaft located beneath the surface of the earth. Dependent upon individual site evaluation and an evaluation of need, the shaft may be provided with an insulated intake conduit fluidly connected to the air induction chamber so as to keep the air cold as it enters into the earth until it reaches an existing horizontal shaft or underground cavern. The airflow naturally increases in velocity. This is called a "stack-effect" and is similar to the whoosh of air one feels when elevator doors open in a high rise-building. This kinetic force may be designed for use at this phase for power generation by driving wind/turbine generators that are integrated with the substantially vertical insulated intake conduit. The air passes from the intake shaft into the underground cavern (or selected horizontal shaft) and into a passageway located within a heat exchanger located within the cavern. The air is warmed as it passes through the heat exchanger.

The heated air is exhausted through an exhaust conduit located in a substantially vertical shaft and then back into the atmosphere. The substantially vertical exhaust conduit provides another potential location that can be designed with wind/turbine generators to extract the energy from the moving air and subsequently convert the kinetic energy into electrical power. The exhaust conduit may also be provided with a supplemental flow of heated air to increase the mass flow rate through the exhaust conduit and the one or more turbines located therein. The exhaust conduit is capped at the surface of the earth to protect the opening and control distribution of the air as it re-enters the atmosphere.

The system may also utilize a high temperature geothermal heat well to generate steam that will power one or more electrical generators. In addition, the system may produce hydro-electric power from the running water found in underground mines, either from underground aquifers that have been hit by mining operations or rainwater runoff filling the deeper chambers of the mine.

The invention also seeks to provide a solution for converting an environmental and safety hazard such as a mine, either active or abandoned, into a source of almost infinite energy potential.

Accordingly, it is a primary objective of the instant invention to provide a constructive use for abandoned mines. In doing so, a secondary objective will be achieved; the cost of mine remediation will become more justified.

It is an objective of the instant invention to provide other renewable, non polluting energy sources such as; harnessing underground hydroelectric power, tapping an underground geothermal well, creating underground farming to cultivate biomass fuel and or fertilizer, and providing a system for remediation of under ground water sources as well as remediating atmospheric and underground air.

It is a further objective of the instant invention to create an economic opportunity that is beneficial to society, not only by providing renewable non polluting energy, but also by removing many of the environmental and safety hazards which presently exist and are largely ignored. The instant invention will provide an economic stimulus to the present and former mining towns where these geological formations are to be found. It is yet another objective of the instant invention to reduce the production of greenhouse gases by decreasing the amount of electricity produced by the combustion of hydrocarbon fuels.

It is a still further objective of the invention to provide significant amounts of alternative energy to reduce ones dependence upon the availability of petroleum products from oil exporting nations.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

The present invention is based upon the identification and exploitation of geological formations wherein the ambient surface air temperature is cooler than the underground geothermal temperature. Mountainous mining areas are often substantially cooler than the inner earth, geothermal, temperature within the underground caverns of the mines. It being well recognized that cold air naturally descends and warm air rises. While the invention will be described with respect to underground mines, including active, inactive and abandoned mines, it is to be understood that the invention could likewise be used in other types of natural or manmade geological formations such as missile silos, salt domes, tunnels, etc.

Figure 1:
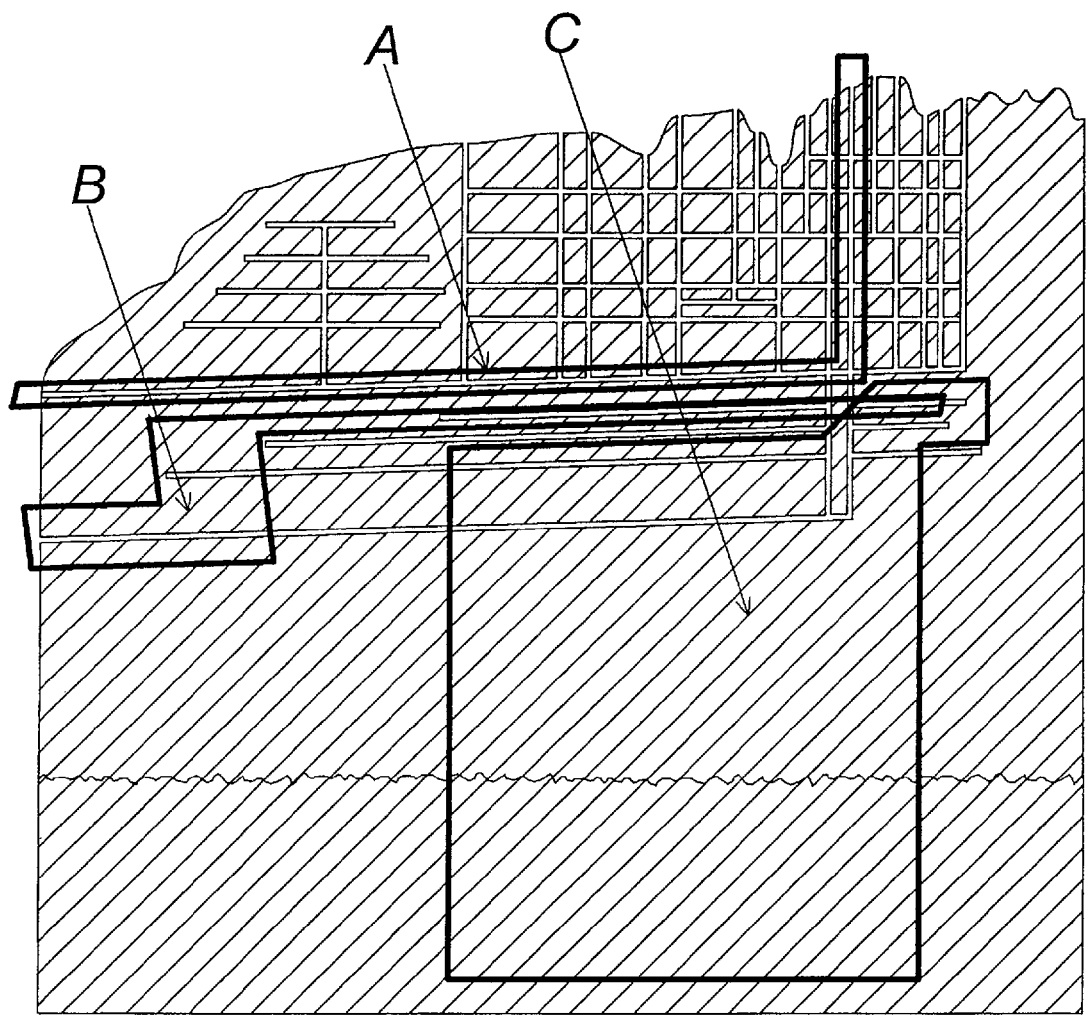
FIG. 1 is a cross sectional view of an existing mine.

Referring now to FIG. 1 of the drawings which contains an illustration of the Ajax Mine located in Cripple Creek, Colo. with a schematic showing how the instant invention would be used in this location. The Ajax Mine is an historic site dating back to the early settlement of Colorado in the late 1800's. Cripple Creek, Aspen, Leadville, in fact, nearly all of Colorado's Western Slope settlements came into being because of mining activities. The Ajax is just one of potentially thousands of mines in Colorado that would be well suited for the disclosed geothermal power system. The historic Ajax Mine stopped commercial mining activities many years ago. The physical characteristics of the Ajax Mine are ideal for implementation of the geothermal power system of the instant invention. There are numerous mineshafts with diameters of at least 10-15 feet and with depths of between 2,500 and 3,500 feet that can be utilized. There are also multiple, massive underground caverns (stopes) and there is access to the mine system through large tunnels (adits) that remain in good condition. In addition, the temperatures within the mine caverns are high. It is believed that they range from 70 to over 100 degrees Fahrenheit. The ambient temperature at the surface of the earth in this mountainous region is low. Cripple Creek's weather average temperature ranges in January are between −3° Fahrenheit, −19° Celsius and 32° Fahrenheit, 0° Celsius. The average July temperatures are between 43° Fahrenheit, 6° Celsius and 78° Fahrenheit, 25° Celsius. Because of the differential between the atmospheric and internal mine temperatures, the mass of air that will be inducted into the geothermal power system will be substantial and will produce significant kinetic energy that can be converted into electrical power. As shown in FIG. 1 in general terms the geothermal power system includes an air intake shaft, a cavern (or stope), and an air exhaust shaft.

Figure 2:
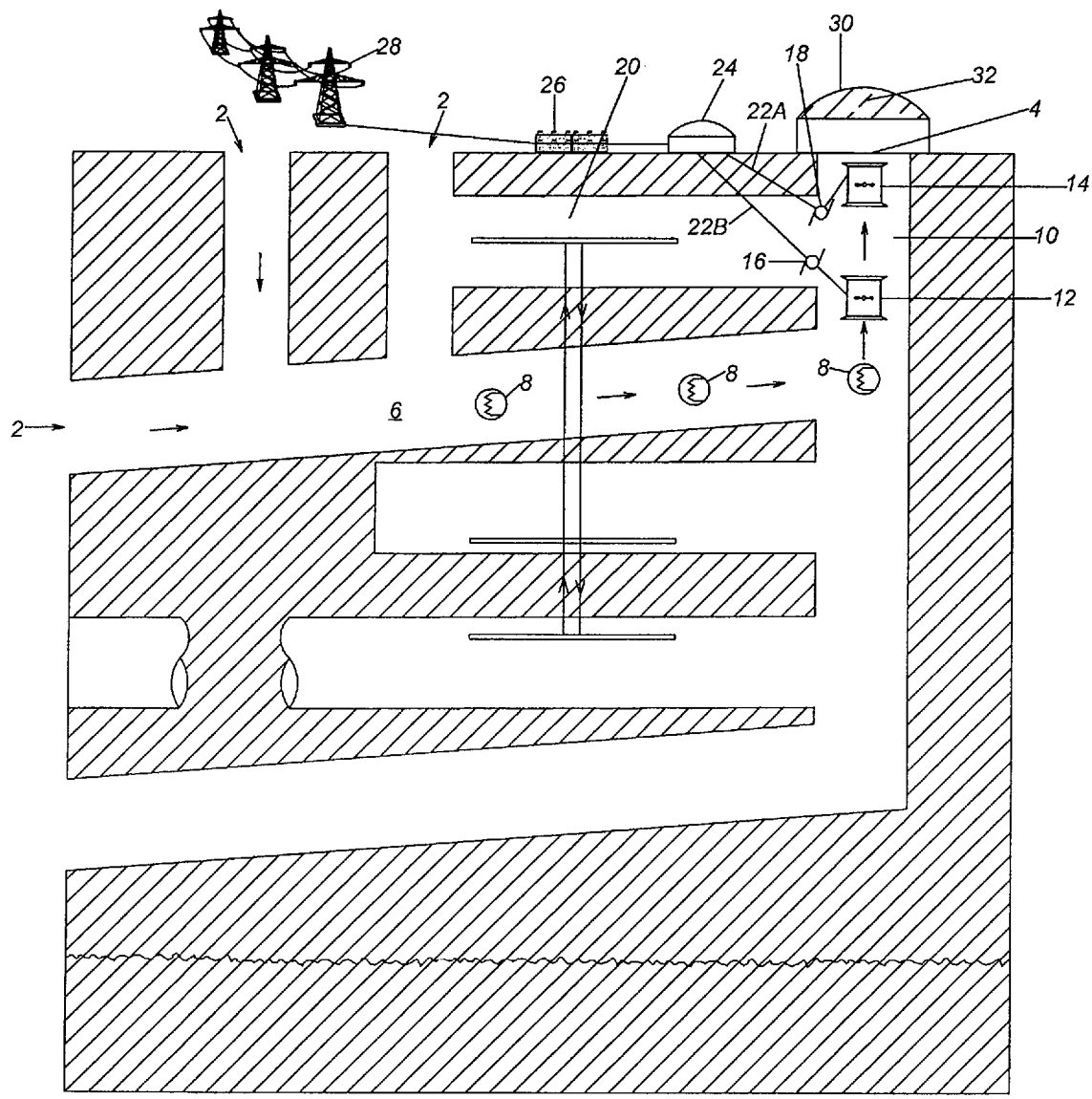
FIG. 2 is a detailed view of the low temperature Geothermal Energy Conversion System (GECS) outlined in the encircled area designated as "A" in FIG. 1.

FIG. 2 is an enlarged view of the low temperature Geothermal Energy Conversion System (GECS) outlined in the encircled area designated as "A" in FIG. 1. The temperature and air pressure differential occurring with hard-rock underground mines produces persistent airflows in subsurface mineshafts. The system uses the already existing shafts and tunnels of the mine to cause a constant flow of air. This airflow is channeled and optimized by design using mining ventilation software. All possible areas of leakage and seepage of air from the primary intake to the exhaust path are sealed by air-doors, sandbags, or other mechanical devices as necessary. As the air exits from the mine through ventilation shafts, turbine(s) capture the kinetic energy and transform it into electrical power before it is released back into the atmosphere. Any suitable turbine and generator set can be used. The preferred embodiment of the turbine is a "ducted" or augmented turbine, such as the one designed by Flodesign®, Inc. or the Enflo Windtec® ducted turbine. While any simple wind turbine design would turn in the air and make kinetic energy, the "ducted" design is preferable because the wind force in the mine tunnel will be similar to that of a wind tunnel, always moving in a perpendicular direction to the turbine blades. Diffuser augmented turbines can achieve conversion efficiencies much higher than conventional wind turbines when the wind flows directly into the concentrator. Likewise, any generator properly sized to the turbine would convert the kinetic energy into mechanical energy. The preferred embodiment of the generator is a low-torque, variable force generator such as the "Brickett Variable Force Generator"®, optimized for the very tightly bracketed wind speed that will be persistently in force as it passes through the turbine. After analysis of the mine conditions with the mining ventilation software and modeling of the various types of machines that are available, the most efficient turbine and generator will be incorporated into the Low-temperature Geothermal Energy Conversion System (GECS) installation. Once installed with electronic monitoring sensors, the power plant is a low-maintenance, passive operation that can be remotely controlled from a central base station. This methodology is founded upon three well established principles of physics; (1) the chimney (or stack) effect, (2) geothermal heat and (3) a turbo-generator.

As shown in FIG. 2 the system includes an abandoned or active mine 1, which is shown schematically and not drawn to scale, that includes a plurality of substantially horizontally mine shafts and a plurality of substantially vertical mine shafts. The mine 1 includes a plurality of air inlets 2 each directly feeding either a horizontal or vertical mine shaft and at least one outlet 4. The one or more inlets communicate with a horizontal or nearly horizontal mine tunnel shaft 6, or cavern, that allows for the transfer of heat within the low temperature geothermal conversion system (GECS). The walls of tunnel shaft 6 being considerably warmer that the temperature of the ambient air. Located within tunnel shaft 6 are one or more heat exchangers 8. Heat exchangers 8 act to increase the heat transfer between the walls of the tunnel shaft 6 and the air passing there through. By way of example, the heat exchangers may be of the direct contact type that is comprised of plurality of thermally conductive fins that are in direct contact with the rock formations and over which the air directly passes. The use of such heat exchangers serves to increase the contact surface between the warmer rock formations and the cooler ambient air. Alternatively, an indirect heat exchanger can be used wherein heat is transferred between the rock formations and the air via a closed working fluid. Connecting tunnel shaft 6 with the outlet 4 is a substantially vertical exhaust shaft 10. A first wind turbine 12 is located in substantially vertical shaft 10 just downstream of the outlet from substantially horizontal tunnel shaft 6. A supplemental substantially horizontal tunnel shaft 20 connects at least one of the air inlets 2 with substantially vertical exhaust shaft 10. The supplemental tunnel shaft 20 provides an additional heat source to warm the cooler air entering from one of the inlets 2 and subsequently exiting through outlet 4. A second wind turbine 14 is located downstream of the first wind turbine 12 and the outlet of supplemental tunnel shaft, or cavern, 20 and upstream of the outlet 4. A first electrical generator 16 is mechanically connected to the first wind turbine 12 and a second generator 18 is mechanically connected to the second wind turbine 14. Electrical lines 22A and 22B connect generators 16 and 18 to utility building 24 and subsequently to substation 26 and high voltage power lines 28. Additional turbines and generators (not illustrated) can also be located downstream of inlets 2 and upstream of tunnel shaft 6 and supplemental tunnel shaft 20. A domed housing 30 is located above outlet 4 and provides safety and security for the exhaust shaft 10. The domed structure can be constructed using airform, polyurethane foam, steel reinforcing bar and shotcrete. The result will be a cost efficient, super insulated and disaster resistant building. The roof of housing 30 includes a plurality of adjustable louvers 32 that serve to open and close upper surface of the housing 30. While the domed housing is the preferred embodiment, any suitable construction may be used.

Figure 3:
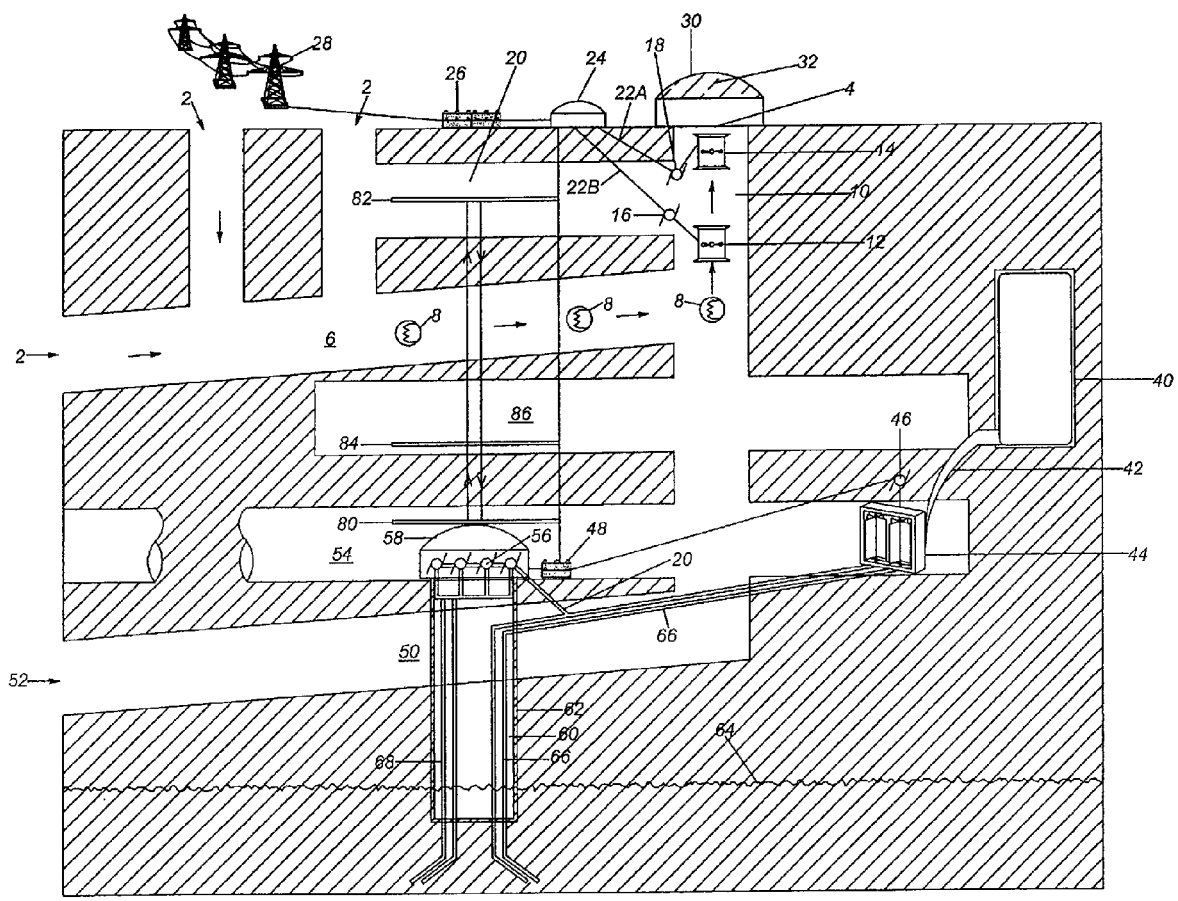
FIG. 3 is a detailed view of the high temperature Geothermal Energy Conversion System (GECS) outlined in the encircled area designated as "B" in FIG. 1.

FIG. 3 is an enlarged view of the high temperature Geothermal Energy Conversion System (GECS) outlined in the encircled area designated as "B" in FIG. 1. Underground mines also serve as an efficient conduit to reach deeper and hotter geothermal reservoirs. Starting from the significant underground depth of certain deep mines, additional drilling or boring may tap underground geothermal wells, e.g., crystalline rock formations or hot water aquifers, which could enable use in any of the other potential hydrothermal applications—dry steam, flash steam or binary power systems. Alternatively, the geothermal well may be drilled from the surface just above the mine formation. The preferred embodiment of a dry steam or flash steam turbo-generator would be a GE multi-megawatt condensing steam turbine generator, a proven technology for decades. Other similar but more modern designs may accomplish the task with greater efficiency. The preferred embodiment of the binary power system, where nearly boiling heated water is used to boil a working fluid such as Freon or ammonia, which has a lower boiling point than water, is the United Technology "Pure Cycle"™ binary geothermal generator system. Other products of a similar purpose exist and would be evaluated for inclusion in this phase of power generation.

Crystalline rock formations are commonly found in areas where hard rock mining for metals has occurred. However, in order for hydrothermal power harvesting activities to be viable, adequate water resources are needed. Many deep hard rock mines have areas that are flooded and filled with millions to billions of gallons of water. The U.S. Geologic Survey has published an atlas depicting crystalline rock aquifers in the Eastern half of the U.S. (http://water.usgs.gov/ogw/aquiferbasics/crystal.html) that coincides with both large population centers and areas of significant past and present mining activities. These areas are located in the upper Mid-West near the mining state of Minnesota, Michigan (Upper Peninsula) and northern Wisconsin; northeastern New York and the New England States; and the Piedmont and Blue Ridge Mountains running roughly from Alabama northeast to southern New York.

Development costs are a significant economic component of any geothermal project. For a lower-grade Enhanced Geothermal System (EGS), the cost of the well field can account for 60% or more of the total capital investment. From a mining geothermal perspective, mechanical excavation actually addresses a wide variety of new, more advanced means of penetrating rock that ranges from relatively soft rock, using cutter bits, to very hard (e.g. crystalline) rock, using disc cutters, to excavate the rock. With a great deal of the mineralized deposits lying more than 5,000 ft below the surface, more efficient means of accessing the ore were needed to reach the deeper deposits and be mined profitably and safely.

A mining process, raise boring, fostered this new technology and with a resulting reduction in costs, time and energy usage led to development of variations that have enabled means of using mechanical excavation to bore raises vertically, horizontally or diagonally. Thus, the additional operational costs of pursuing a deeper geothermal source and the elimination of back break from use of explosive mining creating reduced resistance on the fluids passing through the excavated development are all in keeping with the objective of precluding negative environmental impact. Moreover, these evolutionary excavation methods would enable expansion of the system to also use underground mines to reach greater depths (approaching an additional 7,000 ft from lower levels of existing or abandoned mines) for hydrothermal quality geothermal heat sources. The primary benefits of such an expansion are reduction in construction time; smoother surfaces resulting in less resistance and greater energy recovery; and improved safety during site installation activities.

As shown in FIG. 3 the high temperature system includes a subterranean source of water such as an underground water aquifer 40. A man made or naturally occurring passageway 42 allows the water to fall from the aquifer under the influence of gravity. The falling water is then directed through a hydraulic turbine 44 that is mechanically connected to an electric generator 46. The output of the electrical generator 46 is then conducted to underground substation 48. The output of the underground substation 48 is then transmitted via utility building 24 to substation 26 and then to high voltage power lines 28. Located at a deeper area of the mine is a substantially horizontal tunnel that is typically used as a lower drainage tunnel 50 having a surface entrance 52. In a tunnel or chamber 54 located above drainage tunnel 50 are a plurality of steam powered electrical generators 56. The steam turbine generators 56 are positioned within a housing 58 located in chamber or tunnel 54. A bore hole 60 is drilled between chamber 54 through or around drainage tunnel 50 and down into an area below the line 64 where the rock formations are crystalline, volcanic and contain large amounts of heat energy. The bore 60 is lined with a casing 62. The water exiting the outlet of hydraulic turbine 44 is directed via a first fluid conduit 66 into the area below line 64 that contains rock formations of high heat value. The water exiting the first conduit 66 is converted to steam by virtue of the high temperature rock formations. The lower portion of conduit 66 is positioned within the casing 62. A second conduit 68 also positioned within casing 62 conducts steam from its inlet within the high temperature rock formations to the steam turbine generators 56 located with tunnel 54. The water and steam at the outlets of the steam turbines 56 is directed via fluid conduit 70 back to water line 66 to be converted to steam. Also located within tunnel or chamber 54 is a heat exchanger 80. Heat exchanger 80 is designed to capture and reclaim the waste heat generated by steam turbine generators 56. A portion of the waste heat can be transmitted to heat exchanger 82 located in supplemental tunnel shaft 20 to provide additional heat to the air passing there through. An additional portion of the waste heat is conveyed to a heat exchanger 84 located in an intermediate chamber 86 that will be discussed in more detail in FIG. 4.

Figure 4:
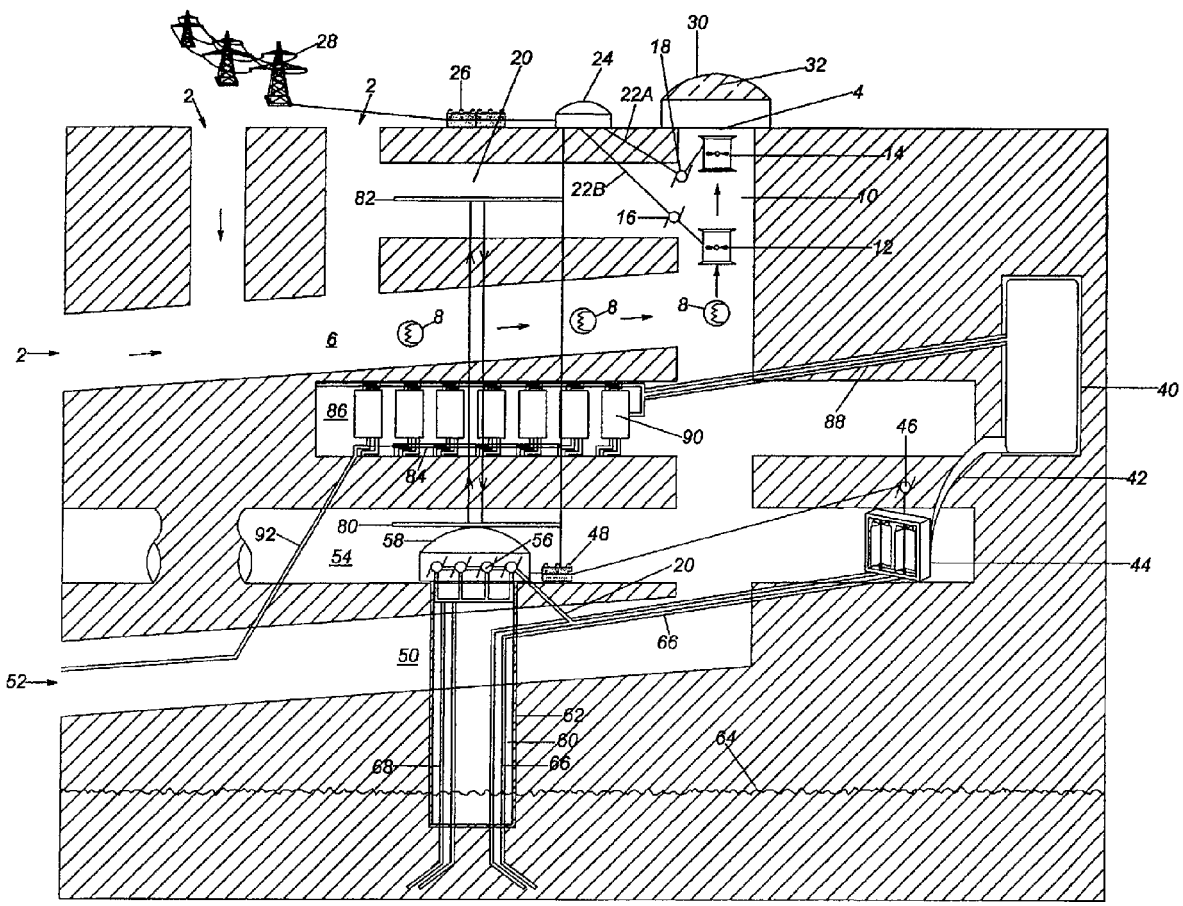
FIG. 4 is a detailed view of the algae production system outlined in the encircled area "C" shown in FIG. 1.

FIG. 4 is a detailed view of the hydro-electric power generation and algae production system outlined in the encircled area "C" shown in FIG. 1. Mines often have a source of running water, either from underground aquifers that have been hit by mining operations or by rainwater runoff filling the deeper chambers of the mine. In many cases, the mines have been designed with a downward sloping drainage tunnel (s) to naturally evacuate the water from within the mine. In other instances, large volume pumping mechanisms are used to dewater the mine. When there is a source of running water, the opportunity exists to pass the flow through a hydro turbine, thus converting the movement into mechanical (electrical) energy. Miles of geothermally heated underground tunnels exist and provide an opportunity to utilize state-of-the-art commercial photo-bioreactor systems for the cultivation and harvesting of algae oil. The oil may be refined into biodiesel or jet fuel. The remaining algae bulk product can be dried and used as fuel for a biomass steam energy plant, providing another source of reliable base-load power.

The primary ingredients for a commercially viable biofuel/biomass system are present within the system. Power is by far the largest expense of producing biofuel and the system has abundantly available renewable energy power for that use. Light used to be restricted to undependable sunlight, but can now be replicated using special spectrum LED artificial lighting devices, heretofore representing prohibitively costly energy consumption for growing algae on a commercial scale.

Water, enriched with minerals and nutrients, is the second-most important component, readily available in any installation that includes the biofuel system. $CO_2$ is a natural byproduct of filtering the large amounts of air that will flow through the system. In its own right, an alga uses $CO_2$ as an essential ingredient to the photosynthesis process. Lastly, and importantly, it is a constant source of temperature and protection from outside plant infections. This element has been lacking in all but laboratory experimental facilities, as most algae cultivation farms to date have used large amounts of surface land for man-made ponds or raceways. The inherent nature of a constant temperature and protection from unwanted elements naturally occur in a mining environment, plus the hundreds of miles of geothermally heated underground tunnels exist and can provide an opportunity to utilize non-agricultural "land" and state-of-the-art commercial photo-bioreactor systems for the cultivation of algae, which may be refined into biodiesel or jet fuel. The remaining algae bulk product can be dried and sold, or used as biomass to generate additional energy.

The preferred method utilizes an off-the-shelf product offered by Origin Oil, Inc. This system allows scalable industrialization to make algae a high-yield, cost-competitive replacement for petroleum. The artificially lit LED lighting used in a photo-bioreactor system is also available from other manufacturers and the Origin Oil system is only used by way of example. The unique aspect of a synthetically lit system is that the power requirements will be largely or completely met by internally generated renewable energy sources. This is rather than the counter-productive option of creating an energy efficient product using environmentally costly traditional fossil fuel resources.

The system also has the capability of capturing $CO_2$ greenhouse gases. Millions of cubic meters of atmospheric air pass through the system annually. Before the captured air is released back into the atmosphere, $CO_2$ and other harmful gases may be removed. The $CO_2$ can be fed to the algae cultivation system, which uses it in the photosynthesis process and releases pure oxygen. The preferred embodiment of this methodology is a sponge-like filtering device such as has been developed by Professor Klaus Lackner of Columbia University and developed commercially by Global Research Technologies. This field is expanding rapidly and other technologies are presenting themselves that may be more efficient. Quicklime is another material that can be used to absorb large quantities of carbon dioxide.

A water supply in or near the mine may be used for the High-Temperature GECS water supply line and/or the water feed to the algae cultivation system. At a point, such as after being distilled as steam or in the algae separation process, the water will be in a cleaner state than it began. Additional standard water filtration equipment may be employed to render the water drinkable. The water may be stored in a localized water tank or piped to the source of a water supply, such as a municipal water plant.

As shown in FIG. 4 the hydro electric power generation and biofuel/biomass system also includes a fluid conduit 88 that will conduct water from aquifer 40 to chamber 86. Located within chamber 86 are large numbers of containers 90 that are used for the production of algae. The water from conduit 88 provides the necessary water to algae production. The waste heat from the steam turbine generators 56 is transmitted to heat exchanger 84 that can be in the form of a radiant sub floor heater. The sub floor includes permeable carbon dioxide capture sponges or other capture devices for pass through capture of carbon dioxide and other harmful gases. The water from aquifer 40 provides the necessary nutrients for the growth of algae and the algae will grow under the influence of LED lighting. The tanks 90 are fluidly connected to an algae output line 92 that is positioned within the lower drainage tunnel 50. Upon reaching the surface, the algae may be further treated to produce biomass and biofuel at a facility adjacent the mine.

Figure 5:
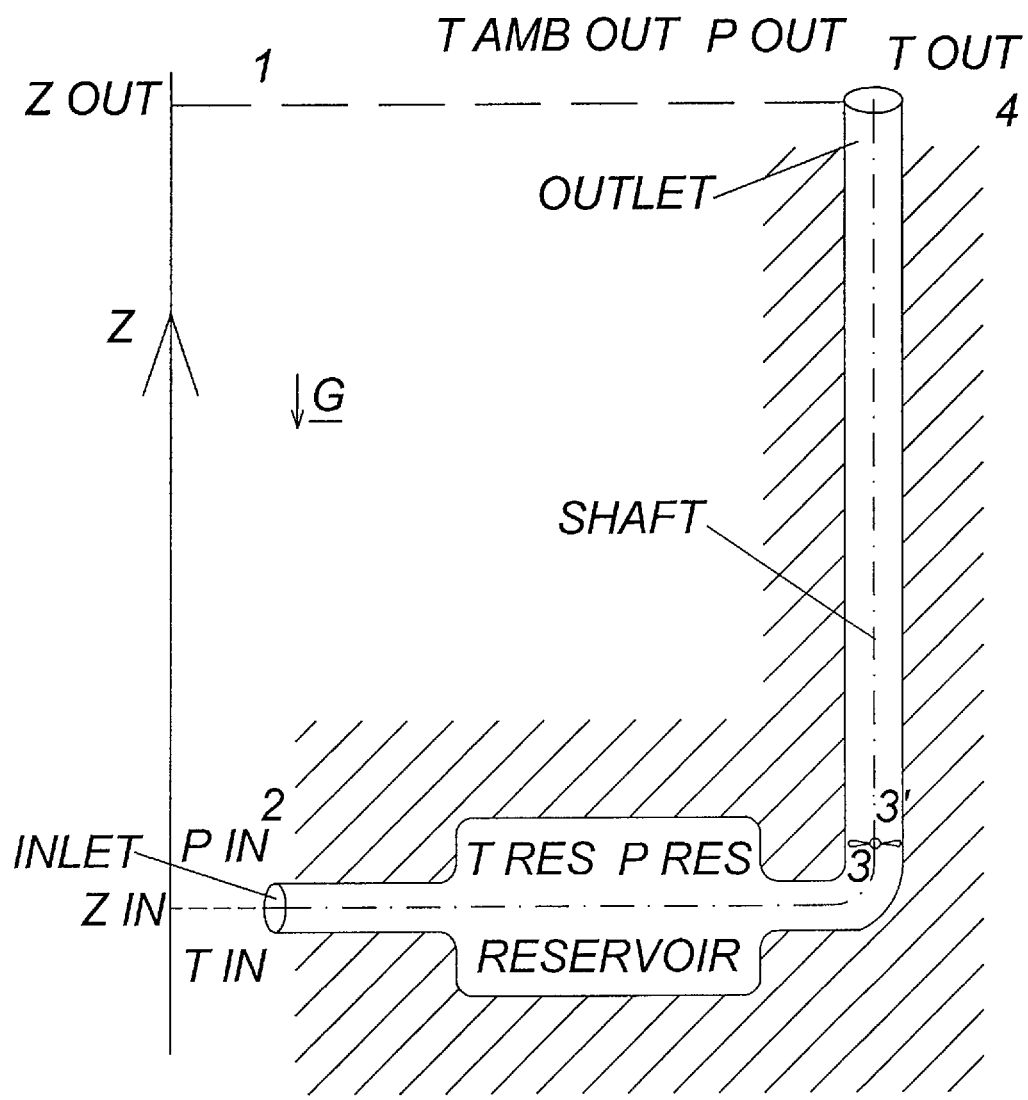
FIG. 5 is a schematic representation of the low temperature Geothermal Energy Conversion System (GECS).
Figure 6:
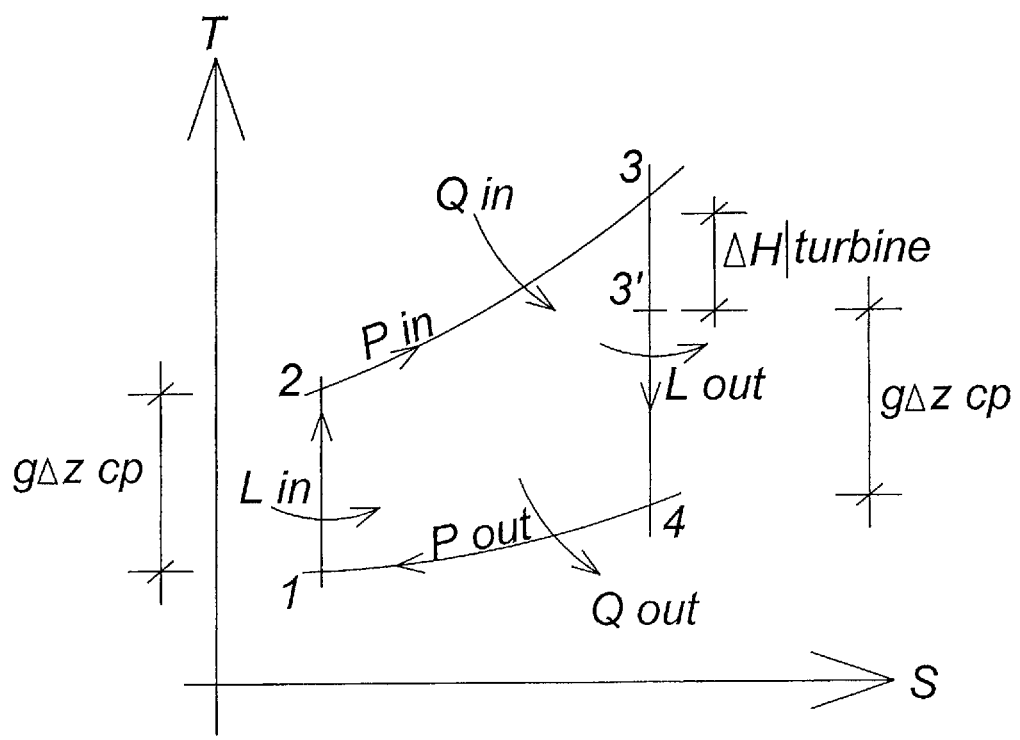
FIG. 6 is a representation of the thermodynamic cycle associated with the Geothermal Energy Conversion System (GECS).

The Geothermal Energy Conversion System is schematically represented in FIG. 5. As shown therein the underground cavern is referred to as a reservoir, and it is where heat is exchanged between warm underground earth and flowing air. The available geopotential power is unknown at this time, but it is assumed that a constant air temperature in the reservoir can be reached. The air speed in the reservoir is relatively low due to the assumed large dimensions of the reservoir, and therefore it is assumed that the residing time interval (and therefore the associated convection heat coefficient) is sufficiently large to raise the temperature of the air mass from the outside value (T amb in) to a constant and uniform value, i.e. T res. The elevations of the inlet reservoir and shaft inlet are considered equal with little loss in generalization. In operation, the atmospheric air enters the GECS at Zin (Pin, Tin) and it is heated at constant pressure (Pin=Pres) in the reservoir. Successively, air expands while it rises in the shaft to a final pressure and temperature (Pout=Pamb,Tout) at an elevation equal to Z out. It is assumed that the expansion occurs under adiabatic conditions. The air parcel can be thought of as adiabatically compressing in the atmosphere back from the GECS outlet to the inlet. The atmospheric conditions and lapse rates (gradients in temperature, pressure, and density) can be calculated assuming the ICAO standard atmosphere. Pressure, temperature and relative humidity values were measured at the mine site and complemented the standard atmosphere values.

Given these assumptions, the GECS can be seen as a thermodynamic cycle. A useful representation of the thermodynamic cycle is presented by the T-S (temperature-entropy) diagram, shown in FIG. 5, where the various states of the GECS are connected by lines that represent thermodynamic transformations of the air as it flows in the GECS. The area deliniated by these lines is proportional to the total work done by the system. The proper cycle for the GECS is a Brayton cycle as shown in FIG. 5.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A geothermal power generation system comprising:
a man made underground mine;
an air inlet located at the surface of the earth;
air entering said air inlet at an ambient temperature;
a subterranean cavern located beneath the surface of the earth in said underground mine;
a heat exchanger located in said subterranean cavern;
said subterranean cavern having a naturally occurring geothermal temperature;
a first mine shaft defining a flow path for fluidly connecting the air inlet to said heat exchanger in said subterranean cavern whereby the air entering said air inlet passing through the heat exchanger is heated substantially to the geothermal temperature; and a second mine shaft for fluidly connecting the air passing through the heat exchanger and an exhaust outlet at the surface of the earth;
said ambient temperature is substantially cooler than said geothermal temperature;
whereby a fluid flow is induced between the air entering said air inlet at said cooler ambient temperature, and the air passing through the heat exchanger that is heated to said geothermal temperature and said second mine shaft to an exhaust outlet at the surface of the earth; and
a power plant located in said flow path between the air inlet and the exhaust outlet that is powered by said induced fluid flow;
said system further including a subterranean source of water, a first fluid passageway connecting said source of water to a hot rock formation located beneath the mine, wherein said water is converted to steam, and, a second fluid passageway directing said steam to one or more steam turbine generators located above said hot rock formation.

2. The geothermal power generation system defined by claim 1, wherein said power plant is located in the flow path defined by the second mine shaft.

3. The geothermal power generation system defined by claim 2, wherein one or more additional power plants are located in the second mine shaft.

4. The geothermal power generation system defined by claim 1, wherein said subterranean water source is an aquifer located adjacent the mine.

5. The geothermal power generation system defined by claim 4, further including a passageway that allows water to fall from the aquifer, under the influence of gravity, and into a hydraulic turbine, said hydraulic turbine being mechanically connected to an electric generator.

6. The geothermal power generation system defined by claim 1, wherein said first fluid passageway and said second fluid passageway are positioned within a geothermal well, said geothermal well including a bore having one end within said mine and an opposite end located within rock formations of crystalline and or volcanic rock that contain large amounts of heat energy.

7. The geothermal power generation system defined by claim 1, further including a supplemental subterranean cavern being fluidly connected to said first mine shaft at a first end of said supplemental subterranean cavern and fluidly connected to said second mine shaft at an opposite end of said supplemental subterranean cavern.

8. The geothermal power generation system defined by claim 1, wherein said one or more steam turbine generators includes a condensing steam turbine.

9. The geothermal power generation system defined by claim 1, wherein said one or more steam turbine generators includes a binary power turbine that utilizes a closed system working fluid that is in indirect heat exchange with said steam.

10. The geothermal power generation system defined by claim 1, wherein the output of said power plant is connected to an electrical generator.

11. The geothermal power generation system defined by claim 1, wherein said subterranean cavern includes one or more heat exchangers that are constructed and configured to increase the heat transfer between the walls of the subterranean cavern and the air passing there through.

12. The geothermal power generation system defined by claim 1, said system further including an algae production system that includes water from said subterranean water source, a plurality of containers, artificial lighting devices and waste heat from said one or more steam turbine generators.

13. The geothermal power generation system defined by claim 1, further including means to filter at least a portion of the air flow to remove carbon dioxide and other pollutants.

14. The geothermal power system defined by claim 1, further including a waste heat heat exchanger positioned proximate said at least one steam turbine generators to capture and reclaim the waste heat generated by said at least one steam turbine generator, said waste heat heat exchanger communicating said waste heat to a second heat exchanger within a supplemental subterranean cavern and a third heat exchanger within a subterranean cavern containing an algae production system.

15. A method for converting a subterranean geological formation into a geothermal power system comprising:
identifying a man made mine formation that includes a subterranean cavern that has first and second mine shafts extending to the surface of the earth and whose subterranean cavern has a geothermal temperature substantially exceeding the average ambient temperature at the surface of the earth;
providing an air inlet at the surface of the earth;
installing a first flow path in the first mine shaft that is fluidly connected to the air inlet;
installing a heat exchanger in the subterranean cavern and fluidly connecting a passageway within said heat exchanger to said first flow path and
installing a second flow path in said second mine shaft to fluidly connect the passageway within the heat exchanger to an exhaust outlet at the surface of the earth and
installing at least one power plant in either the first or second flow path;

whereby air is induced to flow from the air inlet to the passageway within the heat exchanger and then to the exhaust outlet;

said induced air flow providing the source of energy for said power plant; and locating a subterranean source of water, installing a first fluid passageway connecting said subterranean source of water to a hot rock formation located beneath the mine, wherein said water is converted to steam, and installing a second fluid passageway directing said steam to one or more steam turbine generators located above said hot rock formation.

16. A method for converting a subterranean geological formation into a geothermal power system as set forth in claim 15, wherein said geological formation is either an active or abandoned mine.

17. A method for converting a subterranean geological formation into a geothermal power system as set forth in claim 15, wherein plural power plants are installed in the second flow path.

18. A method for converting a subterranean geological formation into a geothermal power system as set forth in claim 15, further providing a passageway that allows water to fall from the subterranean source of water, under the influence of gravity, and into a hydraulic turbine, said hydraulic turbine being mechanically connected to an electric generator.

19. A method for converting a subterranean geological formation into a geothermal power system as set forth in claim 15, including the step of driving an electrical generator with the output of the power plant.

20. A method for converting a subterranean geological formation into a geothermal power system as set forth in claim 15, creating a bore having one end within said mine and an opposite end located within rock formations of crystalline and or volcanic rock, said rock formations containing large amounts of heat energy and;

positioning said first fluid passageway and said second fluid passageway within said bore.

21. A method for converting a subterranean geological formation into a geothermal power system as set forth in claim 15, providing one or more heat exchangers that are constructed and configured to increase the heat transfer between the walls of the subterranean cavern and the air passing there through.

22. A method for converting a subterranean geological formation into a geothermal power system as set forth in claim 15, identifying a man made mine formation that includes a supplemental subterranean cavern that has first and second mine shafts extending to the surface of the earth and whose supplemental subterranean cavern has a geothermal temperature substantially exceeding the average ambient temperature at the surface of the earth.

23. A method for converting a subterranean geological formation into a geothermal power system as set forth in claim 15, providing an algae production system that includes water from said subterranean water source, a plurality of containers, artificial lighting devices and waste heat from said one or more steam turbine generators.

24. A method for converting a subterranean geological formation into a geothermal power system as set forth in claim 15, providing a filtering media to at least a portion of the air flow to remove carbon dioxide and other pollutants.

25. A method for converting a mine into a geothermal power system comprising:

identifying an abandoned or active mine that includes a subterranean geological formation comprised of a subterranean cavern that has first and second mine shafts to the surface of the earth and whose subterranean cavern has a geothermal temperature substantially exceeding the average ambient temperature at the surface of the earth;

securing a license from the property owner to build and operate said geothermal power system;

providing an air inlet at the surface of the earth;

installing a flow path in the first mine shaft that is fluidly connected to the air inlet;

installing a heat exchanger in the subterranean cavern and fluidly connecting a passageway within said heat exchanger to said first flow path and installing a second flow path in said second mine shaft to fluidly connect the passageway within the heat exchanger to an exhaust outlet at the surface of the earth and installing at least one power plant in either the first or second flow path;

whereby air is induced to flow from the air inlet to the passageway within the heat exchanger and then to the exhaust outlet;

said induced air flow providing the source of energy for said power plant; and locating a subterranean source of water, installing a first fluid passageway connecting said subterranean source of water to a hot rock formation located beneath the mine, wherein said water is converted to steam, and installing a second fluid passageway directing said steam to one or more steam turbine generators located above said hot rock formation.

26. A method for converting a mine into a geothermal power system as set forth in claim 25, further comprising the step of:

providing a passageway that allows water to fall from the subterranean source of water, under the influence of gravity, and into a hydraulic turbine, said hydraulic turbine being mechanically connected to an electric generator.

27. A method for converting a mine into a geothermal power system as set forth in claim 25, further comprising the step of:

providing an algae production system that includes water from said subterranean water source, a plurality of containers, artificial lighting devices and waste heat from said one or more steam turbine generators.

28. A method for converting a mine into a geothermal power system as set forth in claim 25, further comprising the step of:

identifying a man made mine formation that includes a supplemental subterranean cavern that has first and second mine shafts extending to the surface of the earth and whose supplemental subterranean cavern has a geothermal temperature substantially exceeding the average ambient temperature at the surface of the earth.

* * * * *